(12) United States Patent
Isgar

(10) Patent No.: US 12,393,963 B2
(45) Date of Patent: *Aug. 19, 2025

(54) SYSTEM FOR DISPLAYING ADVERTISEMENTS WITHIN VEHICLES

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,621

(22) Filed: Jul. 14, 2022

(65) Prior Publication Data

US 2022/0351247 A1 Nov. 3, 2022

Related U.S. Application Data

(63) Continuation of application No. 16/297,857, filed on Mar. 11, 2019, now Pat. No. 11,392,988.

(60) Provisional application No. 62/640,840, filed on Mar. 9, 2018.

(51) Int. Cl.
| | |
|---|---|
| *G06Q 30/02* | (2023.01) |
| *G06Q 30/0251* | (2023.01) |
| *G07C 5/00* | (2006.01) |
| *H04W 4/021* | (2018.01) |
| *H04W 4/46* | (2018.01) |
| *H04W 4/90* | (2018.01) |

(52) U.S. Cl.
CPC ......... *G06Q 30/0266* (2013.01); *G07C 5/008* (2013.01); *H04W 4/021* (2013.01); *H04W 4/46* (2018.02); *H04W 4/90* (2018.02)

(58) Field of Classification Search
CPC ... G06Q 30/0266; G07C 5/008; H04W 4/021; H04W 4/46; H04W 4/90; H04W 4/02
See application file for complete search history.

(56) References Cited

U.S. PATENT DOCUMENTS

| | | |
|---|---|---|
| 6,236,652 B1 | 5/2001 | Preston |
| 9,445,396 B1 | 9/2016 | Herring et al. |
| 10,341,709 B1 * | 7/2019 | Wasserman ........ G06Q 30/0265 |
| 10,665,155 B1 * | 5/2020 | Rao .......... B60K 35/28 |
| 11,392,988 B1 * | 7/2022 | Isgar ........ G07C 5/008 |
| 11,580,575 B1 | 2/2023 | Mirdha et al. |

(Continued)

OTHER PUBLICATIONS

Isgar, Route Advertisement and Entertainment System, Patent Cooperation Treaty Application Serial No. PCT/US24/23553, International Filing Date Apr. 8, 2024, International Search Report and Written Opinion dated Jul. 12, 2024.

*Primary Examiner* — An T Nguyen
(74) *Attorney, Agent, or Firm* — Schmeiser, Olsen & Watts LLP

(57) ABSTRACT

Described is a system for displaying targeted advertisements within a vehicle. The system includes targeted advertisements or other information received from a first vehicle to a second vehicle or multiple other vehicles for display within the second vehicle or the other vehicles. The system uses one or more active displays mounted within the second vehicle or the other vehicles to provide individuals within the second vehicle or the other vehicles with information and messages using the displays. The system can show advertising messages, emergency messages, or other information on the active displays that are relevant to the location of the vehicle or relevant to the individuals within the second vehicle or the other vehicles.

7 Claims, 3 Drawing Sheets

(56) References Cited

U.S. PATENT DOCUMENTS

| | | | |
|---|---|---|---|
| 2006/0130100 A1* | 6/2006 | Pentland | H04N 21/812 725/71 |
| 2006/0270421 A1 | 11/2006 | Phillips | |
| 2008/0140479 A1 | 6/2008 | Mello | |
| 2009/0299857 A1* | 12/2009 | Brubaker | G06Q 30/02 455/99 |
| 2010/0023372 A1 | 1/2010 | Gonzalez | |
| 2010/0042285 A1 | 2/2010 | Abernethy | |
| 2010/0138302 A1 | 6/2010 | Park | |
| 2011/0040626 A1 | 2/2011 | Lin | |
| 2011/0055005 A1 | 3/2011 | Lang | |
| 2012/0054028 A1* | 3/2012 | Tengler | G06Q 30/02 701/438 |
| 2012/0191537 A1 | 7/2012 | O'Sullivan et al. | |
| 2014/0316900 A1* | 10/2014 | Amla | G06Q 30/0266 705/14.63 |
| 2015/0248703 A1 | 9/2015 | Strode | |
| 2015/0371270 A1 | 12/2015 | Mcdevitt et al. | |
| 2016/0042401 A1 | 2/2016 | Menendez | |
| 2017/0255961 A1 | 9/2017 | Parekh et al. | |
| 2019/0034967 A1* | 1/2019 | Ferguson | B60R 21/34 |
| 2019/0135109 A1* | 5/2019 | Miller, Jr. | H04L 12/40189 |
| 2019/0140883 A1 | 5/2019 | Greenberger et al. | |
| 2019/0222885 A1* | 7/2019 | Cho | G06Q 30/0265 |
| 2019/0251600 A1 | 8/2019 | Cabrera et al. | |
| 2019/0266644 A1* | 8/2019 | Cho | H04W 4/44 |
| 2020/0101844 A1* | 4/2020 | Miller, Jr. | B60K 35/00 |
| 2020/0258018 A1* | 8/2020 | Brady | G06Q 10/0631 |
| 2021/0043083 A1* | 2/2021 | Bandi | G08G 1/096716 |
| 2021/0081994 A1 | 3/2021 | Newell | |
| 2022/0076297 A1 | 3/2022 | Isgar | |
| 2022/0116673 A1* | 4/2022 | Cho | G06Q 30/0265 |
| 2022/0148035 A1 | 5/2022 | Kwatra et al. | |
| 2022/0224963 A1 | 7/2022 | Herz et al. | |
| 2023/0047697 A1 | 2/2023 | Cella | |
| 2023/0143472 A1 | 5/2023 | Newell | |

\* cited by examiner

SYSTEM FOR DISPLAYING ADVERTISEMENTS WITHIN VEHICLES

CROSS REFERENCE TO RELATED APPLICATION[S]

This application is a continuation of U.S. Patent Applications entitled "SYSTEM FOR DISPLAYING ADVERTISEMENTS WITHIN VEHICLES," Ser. No. 16/297,857, filed on Mar. 11, 2019, which claims priority to U.S. Provisional Patent Application entitled "SYSTEM FOR DISPLAYING ADVERTISEMENTS WITHIN VEHICLES," Ser. No. 62/640,840, filed Mar. 9, 2018, the disclosures of which are hereby incorporated entirely herein by reference.

BACKGROUND OF THE INVENTION

Technical Field

This invention relates to advertisements in a vehicle, and specifically to a system for displaying targeted advertisements within an autonomous vehicle.

State of the Art

Vehicle owners often look for ways to subsidize the cost of their vehicle. Some vehicle owners allow advertising to be placed on their vehicles as a way to generate income with their vehicle. Vehicle drivers are often looking for specific products or businesses in the area they are in. Billboards may not be providing the information a driver needs. In addition, vehicle drivers may benefit from receiving traffic or emergency messages that are pertinent to their location.

Additionally, vehicles are becoming smarter with onboard computers that assist the vehicle and driver by tracking direction, providing navigation, operating a connected telephone and the like. Further still, autonomous vehicles have been developed and are being refined allowing the vehicle to drive to destinations without the need of driver control.

SUMMARY OF THE INVENTION

The disclosed invention relates to a system for displaying targeted advertisements, the system comprising: a display and an onboard computer coupled within a second vehicle, wherein the onboard computer operates the display; a processor within a first vehicle communicatively coupled to the internet and to the onboard computer, wherein the processor receives information corresponding to the second vehicle from the onboard computer; an advertisement signal receiver communicatively coupled to the processor to provide advertisement information; an emergency signal receiver communicatively coupled to the processor to provide emergency information; and a location detector communicatively coupled to the processor to provide location information, wherein the display shows messages, images, videos or combinations thereof in response to the onboard computer receiving and processing display information sent from the processor, the display information including at least one of the advertisement information, the emergency information, the location information, the second vehicle information or combinations of two or more of the advertisement information, the emergency information, the location information, and the second vehicle information.

Another embodiment includes a system for displaying targeted advertisements within an autonomous vehicle, the system comprising: a display and an onboard computer coupled within an autonomous vehicle, wherein the onboard computer operates the display; a processor within a remote system communicatively coupled to the onboard computer, wherein the processor receives information corresponding to the autonomous vehicle from the onboard computer; an advertisement signal receiver communicatively coupled to the processor to provide advertisement information; an emergency signal receiver communicatively coupled to the processor to provide emergency information; and a location detector communicatively coupled to the processor through the onboard computer to provide location information, wherein the display shows messages, images, videos or combinations thereof in response to the onboard computer receiving and processing display information sent from the processor, the display information including at least one of the advertisement information, the emergency information, the location information, the autonomous vehicle information or combinations of two or more of the advertisement information, the emergency information, the location information, and the autonomous vehicle information.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
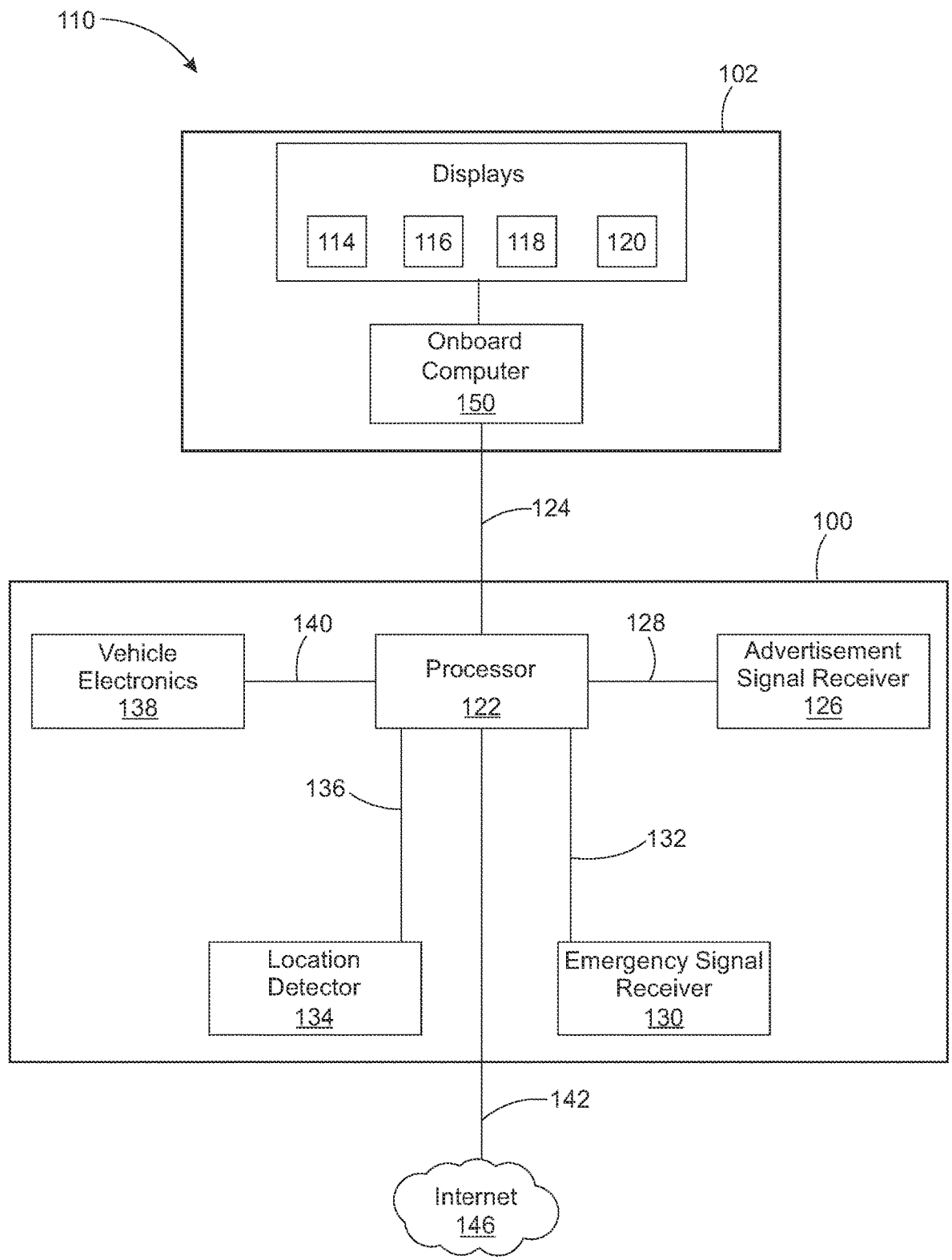
FIG. 1 shows a block diagram of a display system for a vehicle according to an embodiment.

As discussed above, embodiments of the present invention relate to targeted advertisements and other messages received from a first vehicle to a second vehicle for display within the second vehicle and targeted advertisements received within a geo-fence for display within a vehicle.

Vehicle owners sometimes allow advertisers to put ads on the exterior of their vehicle. The owner of the vehicle receives payment from the advertiser for showing the ads, which helps subsidize the cost of the vehicle. These advertisements have taken the form of static images that are painted or attached to the exterior of the vehicle. Disclosed is a system for displaying targeted advertisements that includes targeted advertisements and other messages received from a first vehicle to at least a second vehicle for display within the second vehicle. These targeted advertisements may also be pushed to multiple other vehicles that are located within a predetermined range of the first vehicle. The system can show advertisements and other messages that are visible to individuals within the second vehicle or other vehicles. The first vehicle owner can be paid to operate the system to initiate the advertisements to the display system within the second vehicle or other vehicles. This will generate revenue for the first vehicle owner or reduce the cost of ownership of the vehicle. Alternatively, vehicles may receive targeted advertisements from within a specific geofence, and not rely on a nearby vehicle to initiate advertisements. Viewers of the advertisements may benefit from learning about local vendors from the display system within the vehicle. In addition, individuals may choose to opt-in to an advertising group or service so that those individuals may receive more targeted ads for products and services that they are specifically interested in.

The system for displaying targeted advertisements can display messages other than advertising messages. Vehicle drivers and/or passengers can sometimes benefit from receiving informational messages while they are driving. Display information could pertain to traffic, an emergency situation, news, sports, or weather information, for example. Static or active billboards are often used to convey messages to drivers, but these are only useful to drivers driving by the billboard. The disclosed system uses displays mounted within a vehicle to display the display information to all passengers within the second vehicle. The system can show emergency messages visible to individuals within the second vehicle. Viewers of the emergency messages and other display information can benefit from learning about traffic or other emergency situations that may affect them as they drive.

The disclosed system for displaying targeted advertisements includes an onboard computer and at least one display mounted within the second vehicle, and a processor within in the first vehicle coupled to the onboard computer of the second vehicle that drives the display, the processor operating to push and provide messages to the second vehicle for display on the at least one display. The processor is coupled to an advertisement signal receiver, an emergency signal receiver, vehicle computer receiver, and a location detector. The advertisement signal receiver, the emergency signal receiver, vehicle computer receiver, and the location detector collect information used to generate messages to be shown on the display. The processor gathers information from the advertisement signal receiver, the emergency signal receiver, vehicle computer receiver, and the location detector, uses this information to compose messages, and sends the messages to the one or more displays coupled within the second vehicle. For example, an individual may receive an advertisement for a specific fast food restaurant while driving behind a vehicle that is pushing advertisements for that specific restaurant, or may receive an advertisement for a specific restaurant when the vehicle enters a specific geofence. Individuals around the vehicle, including other motorists or pedestrians, can obtain advertising or emergency situation information by reading the displays. The information shown in the displays can be coordinated with the location of the vehicle so the advertising or emergency messaging is geographically relevant by use of geo-sensing or geo-fencing technology.

FIG. 1 shows an embodiment of a system 110 for targeted advertisements for use with vehicles such as first vehicle 100 and second vehicle 102. System 110 includes one or more displays located in second vehicle 102. In the embodiment shown, system 110 may include four displays, display 114, display 116, display 118, and display 120, as shown in FIG. 1. Each one of displays 114, 116, 118, and 120 may be mounted within the second vehicle 102, and can be seen by observers within the second vehicle 102. Displays 114, 116, 118, and 120 may be LED display, OLED display, or any type of display or screen type display in this embodiment, but this is not meant to be limiting. Displays 114, 116, 118, and 120 can be any type of active display. An active display is a display with active pixels that allows the image or message on the display to change over time. Displays 114, 116, 118, and 120 can be any active light-emissive display, light-reflective display, or other type of active display known now or in the future for displaying an active image. Displays 114, 116, 118, and 120 display words or images that are viewed by drivers, passengers, or other individuals within the second vehicle 102. Displays 114, 116, 118, and 120 display advertising messages, emergency messages, or any other type of message. A message can be a written word or words, an image, a video and combinations of the same.

Displays 114, 116, 118, and 120 can be installed in second vehicle 102 at the factory, or, displays 114, 116, 118, and 120 can be aftermarket products installed after second vehicle 102 is manufactured.

Displays 114, 116, 118, and 120 can display many different types of messages, images, and/or videos. The owner of first vehicle 100 may be compensated for pushing advertisements on one or more of displays 114, 116, 118, and 120. This can help offset the cost of first vehicle 102. The advertisements can change over time and location. System 110 can use geo-sensing to show location-relevant advertisements. The advertisements can be coordinated with the location of first vehicle 100 and second vehicle 102 so second vehicle 102 can get information relevant to their location, such as "Take exit 225 to get Bob's Burgers", for example.

Displays 114, 116, 118, and 120 can show emergency messages telling of traffic events or other important information that individuals within second vehicle 102 may be interested to know. The emergency messages can be coordinated with the location of second vehicle 102 so that individuals within second vehicle 102 are getting location specific information, or to provide such information as "call police" or "need help", for example. Displays 114, 116, 118, and 120 can show messages sent from nearby police or emergency vehicles.

Vehicles 100 and 102 can be any type of wheeled vehicle, flying vehicle, floating vehicle, or any other type of vehicle. In some embodiments, vehicles 100 and 102 are an unmanned or autonomous vehicle.

System 110 includes displays 114, 116, 118, and 120, which are coupled to second vehicle 112. Displays 114, 116, 118, and 120 are each communicatively coupled to an onboard computer 150. The onboard computer 150 may be coupled to a processor 122 located in first vehicle 100 using communication link 124, such as a wireless link. Onboard computer 150 includes the display drivers for each of displays 114, 116, 118, and 120. Processor 122 generates the messages, images and/or videos for each of displays 114, 116, 118, and 120.

System 110 includes an advertisement signal receiver 126 communicatively coupled to processor 122 using communication link 128. Advertisement signal receiver 126 receives advertisement information to be shown on any of displays 114, 116, 118, and 120. Advertisement signal receiver 126 can include an for receiving updated or local advertisements, for communications with an advertisement company, or for any other communications relevant to system 110. Advertisement signal receiver 126 sends information to processor 122 regarding advertisements to be shown on displays 114, 116, 118, and 120.

System 110 includes an emergency signal receiver 130 communicatively coupled to processor 122 via communication link 132. Emergency signal receiver 130 receives emergency, traffic, or other public service type information to be displayed on any of displays 114, 116, 118, or 120. Emergency signal receiver 130 can include an antenna such as antenna 144 (FIG. 1) for receiving updated or local emergency information, for communications from nearby emergency vehicles, or for any other communications relevant to system 110. Emergency signal receiver 130 sends information to processor 122 regarding emergency or other public service messages to be shown on displays 114, 116, 118, and 120.

System 110 includes a location detector 134 communicatively coupled to processor 122 via a communication link 136. Location detector 134 receives location information such as geo-sensing or geo-fencing information, or information needed to determine the location of location detector 134. In some embodiments, location detector 134 is or includes a global positioning sensor. Location detector 134 sends location information relevant to displays 114, 116, 118, or 120 to processor 122 so that processor 122 can display location-based advertisements, emergency messages, or other location dependent content. Location detector 134 can use an antenna for sending or receiving location-related information, for communicating with location satellites, or for any other location communications relevant to system 110. Location detector 134 sends location information to processor 122 so that processor 122 can push location-relevant information to onboard computer 150 to display location-relevant information on displays 114, 116, 118, and 120.

Processor 122 is coupled to a vehicle electronics 138, in this embodiment, via a communication link 140. Vehicle electronics 138 includes the electronic processor and systems used to control first vehicle 100. Processor 122 can obtain information from vehicle electronics 138 or provide information to vehicle electronics 138. In some situations, an occupant of first vehicle 100 may wish to display a message on one of displays 114, 116, 118, or 120. This messaging can be transferred via vehicle electronics 138 to processor 122 so that processor 122 can push the messaging to onboard computer 150 for display on one of displays 114, 116, 118, or 120.

Processor 122 is coupled to the internet 146 via a communication link 142, in this embodiment. Processor 122 can send information to, or receive information from, internet 146 for many different reasons. Processor 122 can download advertisements for display, for example, or other information relevant to system 110 from internet 146. In some embodiments, the owner of system 110 controls displays 114, 116, 118 and 120 via internet 146.

Onboard computer 150 may communicate with processor 122 through communication link 124 information regarding second vehicle 102, such as, but not limited to locations travelled to, typical stops, and the like. Additionally, onboard computer 150 may identify the driver, passenger and/or passengers within second vehicle 102 and this information may be communicated to processor 122 through communication link 124 information regarding the passenger or passengers within second vehicle 102. This allows processor 122 to provide even more specific targeted information and advertisement to each driver, passenger and/or passengers within second vehicle 102.

In some embodiments, the onboard computer 150 may have preloaded data for display on displays 114, 116, 118 and 120. This allows system 110 to display certain advertisements on displays 114, 116, 118 and 120 even when not in range of first vehicle 100 or other similar type of vehicle part of system 110.

Communication links 124, 128, 132, 142, 136, and 140 can be wired or wireless communication links and can use any communication protocol known now or in the future for communications.

In some embodiments, system 110 includes more than one vehicle wherein some of the vehicles operate as first vehicle 100 and the other vehicles operate as second vehicle 102.

Autonomous Vehicles

Figure 2:
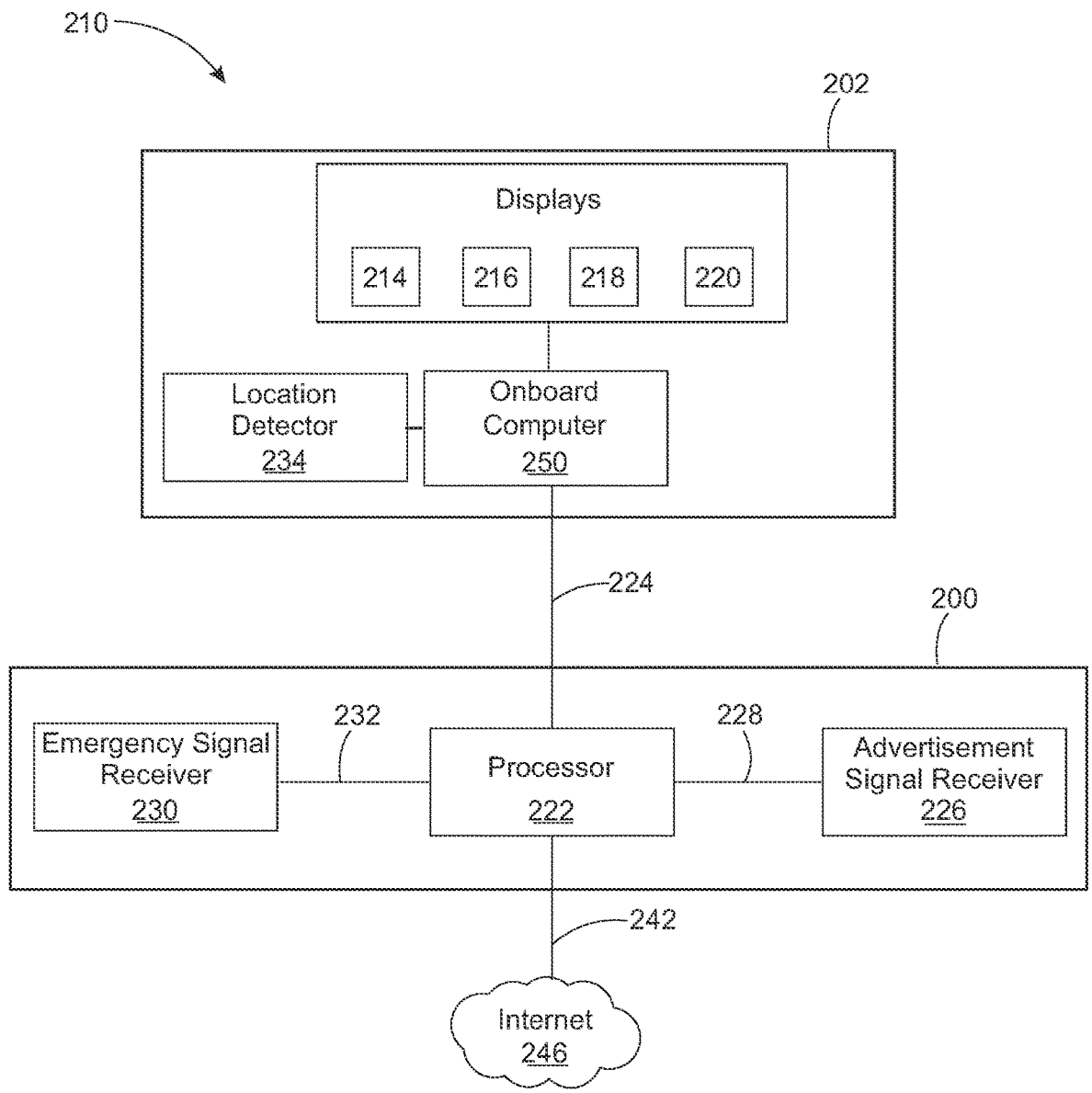
FIG. 2 shows a block diagram of a display system for an autonomous vehicle according to an embodiment.
Figure 3:
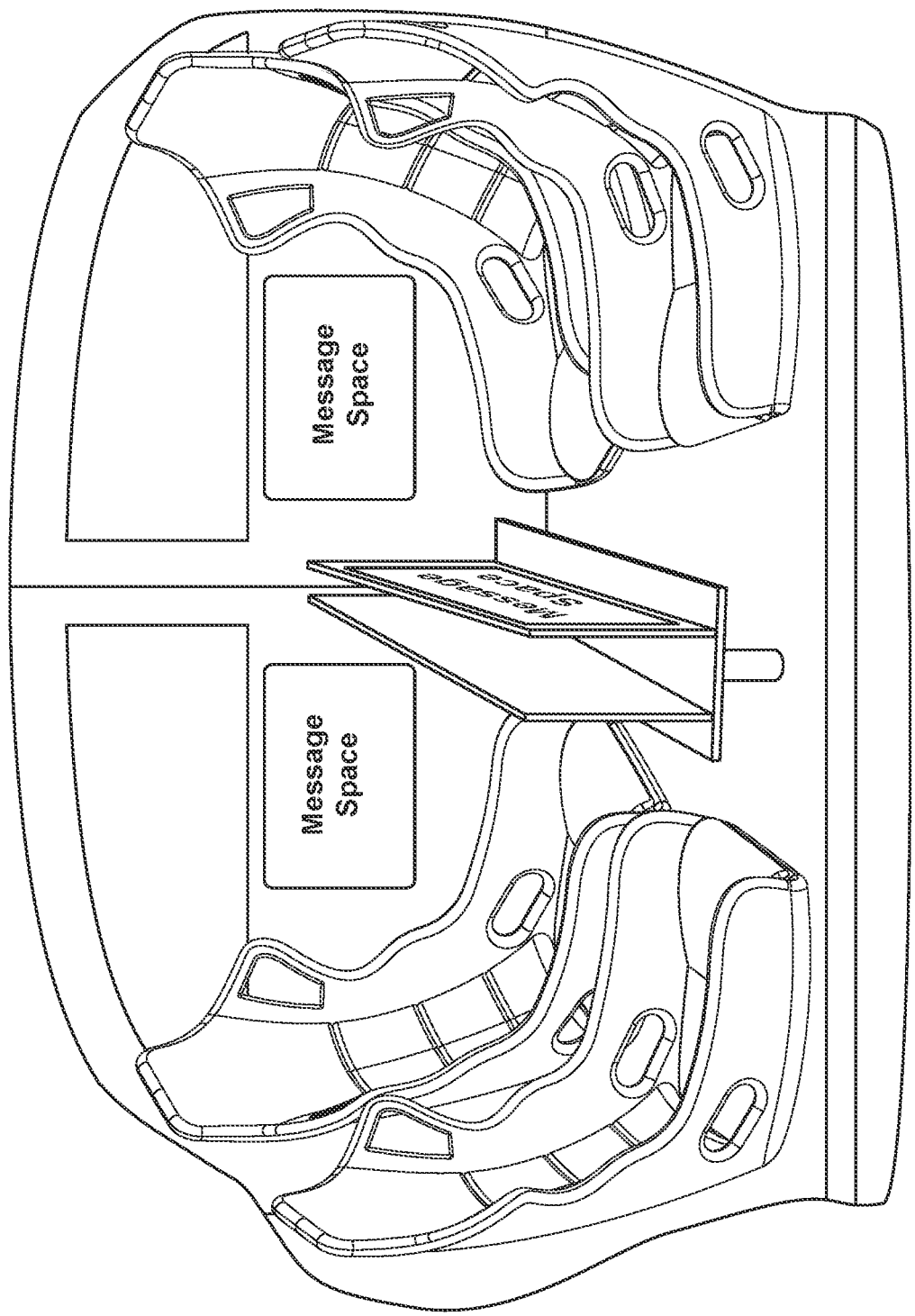
FIG. 3 is a perspective view of an autonomous vehicle with a display system according to an embodiment.

FIG. 2 shows an embodiment of a system 210 for targeted advertisements for use with vehicles such as autonomous vehicle 202. System 210 includes one or more displays located in autonomous vehicle 102. In the embodiment shown, system 210 may include four displays, display 214, display 216, display 218, and display 220, as shown in FIG. 2. Each one of displays 214, 216, 218, and 220 may be mounted within the autonomous vehicle 202, and can be seen by observers within the autonomous vehicle 202. Displays 214, 216, 218, and 220 may be LED display, OLED display, or any type of display or screen type display in this embodiment, but this is not meant to be limiting. Displays 214, 216, 218, and 220 can be any type of active display. An active display is a display with active pixels that allows the image or message on the display to change over time. Displays 214, 216, 218, and 220 can be any active light-emissive display, light-reflective display, or other type of active display known now or in the future for displaying an active image. Displays 214, 216, 218, and 220 display words or images that are viewed by drivers, passengers, or other individuals within the autonomous vehicle 202. Displays 214, 216, 218, and 220 display advertising messages, emergency messages, or any other type of message. A message can be a written word or words, an image, a video and combinations of the same. This is particularly relevant to autonomous vehicles because none of the passengers need to drive and can safely focus on other things, such as work, news and the like in the vehicle. Therefore, targeted advertisements viewed within the autonomous vehicle 202 does not present additional danger or distraction to the driver.

Displays 214, 216, 218, and 220 can be installed in autonomous vehicle 202 at the factory, or, displays 214, 216, 218, and 220 can be aftermarket products installed after autonomous vehicle 202 is manufactured.

Displays 114, 116, 118, and 120 can show emergency messages telling of traffic events or other important information that individuals within second vehicle 102 may be interested to know. The emergency messages can be coordinated with the location of second vehicle 102 so that individuals within second vehicle 102 are getting location specific information, or to provide such information as "call police" or "need help", for example. Displays 114, 116, 118, and 120 can show messages sent from nearby police or emergency vehicles.

Vehicles 100 and 102 can be any type of wheeled vehicle, flying vehicle, floating vehicle, or any other type of vehicle. In some embodiments, vehicles 100 and 102 are an unmanned or autonomous vehicle.

System 210 includes displays 214, 216, 218, and 220, which are coupled to autonomous vehicle 202. Displays 214, 216, 218, and 220 are each communicatively coupled to an onboard computer 250. The onboard computer 250 may be coupled to a processor 222 located on remote system 200 that is remote from the autonomous vehicle 202 using communication link 224, such as a wireless link. Onboard computer 250 includes the display drivers for each of displays 214, 216, 218, and 220. Processor 222 generates the messages, images and/or videos for each of displays 214, 216, 218, and 220 and communicates the same to the onboard computer 250 for processing and display.

System 210 includes an advertisement signal receiver 226 communicatively coupled to processor 222 using communication link 228. Advertisement signal receiver 226 receives advertisement information to be shown on any of displays 214, 216, 218, and 220. Advertisement signal receiver 226 can receive updated or local advertisements, for communications with an advertisement company, or for any other communications relevant to system 210. Advertisement signal receiver 226 sends information to processor 222 regarding advertisements to be shown on displays 214, 216, 218, and 220.

System 210 includes an emergency signal receiver 230 communicatively coupled to processor 222 via communication link 232. Emergency signal receiver 230 receives emergency, traffic, or other public service type information to be displayed on any of displays 214, 216, 218, and 220. Emergency signal receiver 230 sends information to processor 222 regarding emergency or other public service messages to be shown on displays 214, 216, 218, and 220.

System 210 includes a location detector 234 on the autonomous vehicle 202 communicatively coupled to processor 222 via a communication link 224. Location detector 234 determines location information such as global positioning sensor (GPS) information and communicates the GPS location of the autonomous vehicle 202 to the processor 222, so that processor 222 can generate and send, for display, location-based advertisements, emergency messages, or other location-dependent content. Location detector 234 can use an antenna for sending or receiving location-related information, for communicating with location satellites, or for any other location communications relevant to system 210. Location detector 234 sends location information to processor 222 so that processor 222 can generate and send location-relevant information to onboard computer 250 to display location-relevant information on displays 214, 216, 218, and 220.

Processor 222 is coupled to the internet 246 via a communication link 242, in this embodiment. Processor 222 can send information to, or receive information from, internet 246 for many different reasons. Processor 222 can download advertisements for display, for example, or other information relevant to system 210 from internet 246. In some embodiments, the owner of system 210 controls displays 214, 216, 218, and 220 via internet 246.

Onboard computer 250 may communicate with processor 222 through communication link 224 information regarding autonomous vehicle 202, such as, but not limited to locations travelled to, typical stops, and the like. Additionally, onboard computer 250 may identify the driver, passenger and/or passengers within autonomous vehicle 202 and this information may be communicated to processor 222 through communication link 224. This allows processor 222 to generate and provide even more specific targeted information and advertisement to each driver, passenger and/or passengers within autonomous vehicle 202.

In some embodiments, the onboard computer 250 may have preloaded data for display on displays 214, 216, 218, and 220. This allows system 210 to display certain advertisements on displays 214, 216, 218, and 220.

Communication links 224, 228, 232, and 242 can be wired or wireless communication links and can use any communication protocol known now or in the future for communications.

Additionally, some embodiments of the system 210 may incorporate autonomous car to autonomous car communication abilities. Further still, some embodiments of the system 210 may include a vehicle social network that groups autonomous vehicles by location, by heavily travelled to locations, or any other means of establishing groups of autonomous vehicles.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A system for displaying targeted advertisements, the system comprising:
   a first vehicle;
   a display coupled within a second vehicle;
   an onboard computer coupled to the display within the second vehicle and viewable by occupants within the second vehicle, wherein the onboard computer operates the display and identifies a driver, at least one passenger, or the driver and the at least one passenger within second vehicle;
   a processor within the first vehicle communicatively coupled to the onboard computer within the second vehicle when the second vehicle is within a predetermined distance from the first vehicle, wherein the processor receives second vehicle information corresponding to the second vehicle from the onboard computer, including the identity of the driver, the identity of the at least one passenger, or the identities of the driver and the at least one passenger;
   an advertisement signal receiver within the first vehicle communicatively coupled to the processor to provide advertisement information, wherein the advertisement signal receiver receives location-relevant advertisement information from another source;
   an emergency signal receiver within the first vehicle communicatively coupled to the processor to provide emergency information, wherein the emergency signal receiver receives location-relevant emergency information from another source; and
   a location detector within the first vehicle communicatively coupled to the processor to provide location information corresponding to a location within a geo-fence, wherein the location-relevant advertisement information and the location-relevant emergency information correspond to the geo-fence, wherein the display within the second vehicle shows messages, images, videos or combinations thereof in response to the onboard computer receiving and processing display information sent from the processor, wherein the display information includes the location-relevant advertisement information and the location-relevant emergency information displayed in an order based on a priority assigned to the advertisement information and specifically targeting the driver, the at least one passenger or the driver and the at least one passenger.

2. The system for displaying targeted advertisements of claim 1 wherein display information sent from the processor includes the location information.

3. The system for displaying targeted advertisements of claim 1 wherein display information sent from the processor includes the second vehicle information.

4. The system for displaying targeted advertisements of claim 1 wherein display information sent from the processor includes combinations of two or more of the advertisement information, the location information, and the second vehicle information.

5. The system for displaying targeted advertisements of claim 1, wherein the second vehicle is an autonomous vehicle.

6. The system for displaying targeted advertisements of claim 1, wherein the first vehicle is an autonomous vehicle.

7. A system for displaying targeted advertisements in an autonomous vehicle, the system comprising:
   a remote system comprising a processor, an advertisement signal receiver coupled to the processor, and an emergency signal receiver coupled to the processor, wherein:
      the advertisement signal receiver receives location-relevant advertisement information from another source and provides it to the processor; and
      the emergency signal receiver receives location-relevant emergency information from another source and provides it to the processor; and
   an autonomous vehicle comprising an onboard computer, a display coupled to the onboard computer, and a location detector coupled to the onboard computer, wherein:
      the onboard computer identifies a driver, at least one passenger, or the driver and the at least one passenger within second vehicle;
      the processor of the remote system is coupled to the onboard computer of the autonomous vehicle; and
      the location detector determines location information of the autonomous vehicle and provides it to the onboard computer, the location information corresponding to a location within a geo-fence, wherein the location-relevant advertisement information and the location-relevant emergency information correspond to the geo-fence, and wherein the location information of the autonomous vehicle, the identity of the driver, the identity of the at least one passenger, or the identities of the driver and the at least one passenger are sent to the processor of the remote system from the onboard computer; wherein:
      in response to receiving the location information of the autonomous vehicle, the processor of the remote system generates and sends display information to the onboard computer, the display information comprising the location-relevant advertisement information, the location-relevant emergency information and a priority assigned to the location-relevant advertisement information and the location-relevant emergency information indicating a display order; and
      in response to receiving the display information, the on board computer displays the location-relevant advertisement information and the location-relevant emergency information in the display order determined by the priority and specifically targeting the driver, the at least one passenger or the driver and the at least one passenger.

\* \* \* \* \*